United States Patent [19]

Minney et al.

[11] Patent Number: 4,490,598
[45] Date of Patent: Dec. 25, 1984

[54] BLOOD TUBING SEALING UNIT

[75] Inventors: Stephen C. Minney; Daniel C. Harmony, both of Tucson, Ariz.

[73] Assignee: Engineering & Research Associates, Inc., Tucson, Ariz.

[21] Appl. No.: 429,272

[22] Filed: Sep. 30, 1982

[51] Int. Cl.³ ............................................... H05B 9/24
[52] U.S. Cl. ............................ 219/10.81; 219/10.53; 156/358; 156/380.1
[58] Field of Search ............... 219/10.81, 10.53, 10.75, 219/518; 156/358, 380.1

[56] References Cited

U.S. PATENT DOCUMENTS 4,013,860 3/1977 Hosterman et al. ............. 219/10.81
4,186,292 1/1980 Acken ............................... 219/10.81

Primary Examiner—C. L. Albritton
Assistant Examiner—Marvin M. Lateef
Attorney, Agent, or Firm—Cahill, Sutton & Thomas

[57] ABSTRACT

A solenoid operated moveable jaw cooperates with a fixed jaw protruding from a blood tubing sealing unit and formed as part of a relatively massive heat sink to effect seals on liquid filled plastic tubing upon transmission of RF energy timed to coincide with a degree of initial mechanical compression of the tubing by the jaws after the movement of the moveable jaw has been triggered by the tubing intercepting and reflecting a beam of light. Dissipation of heat from the exposed part of the fixed jaw is by convection. Dissipation of heat from the enclosed part of the fixed and moveable jaws and that produced by the circuitry generating the RF energy internal to the sealer unit is effected by channeling the heat by conduction from all internal heat sources to the bottom and rear plates of the unit and dissipating the heat from the bottom and rear plates to the atmosphere by convection.

8 Claims, 13 Drawing Figures

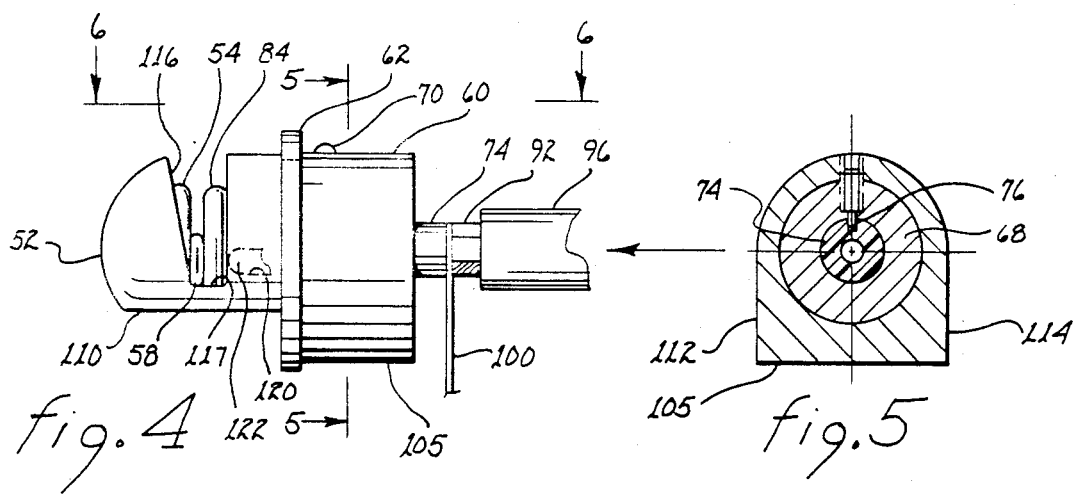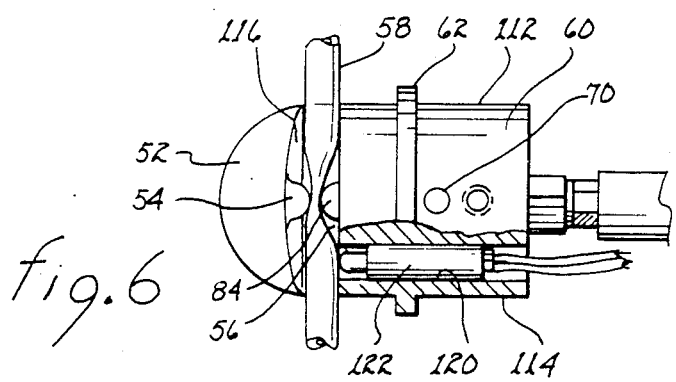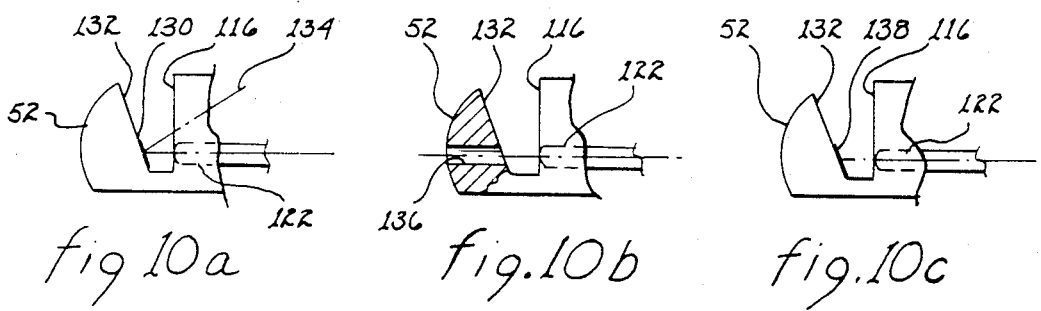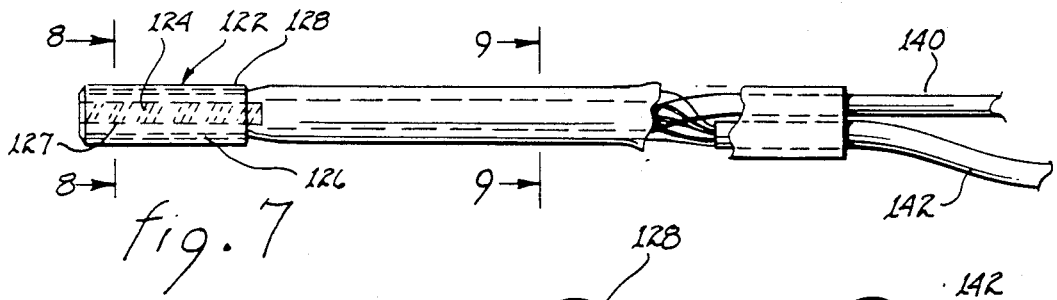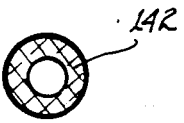

BLOOD TUBING SEALING UNIT

The present invention relates to heat sealers and, more particularly, to heat sealers for liquid filled tubing.

The collection of blood from donors is a critical function performed in all towns, cities, and metropolitan areas as the need for fresh blood and plasma by hospitals never diminishes. Consequently, various blood collection centers have been established at permanent locations and mobile blood collection units are employed to service remote areas or to obtain blood from donors at specific high density locations such as shopping centers, factories, office buildings, etc.

The process for collecting blood is a relatively simple process with respect to the donor's participation. However, the means for storing and preserving the collected blood requires relatively sophisticated techniques and equipment to minimize loss from contamination or spoilage.

U.S. Pat. No. 4,027,735, entitled "BLOOD MIXING AND WEIGHT MONITORING APPARATUS" assigned to the present assignee, describes a device for collecting a predetermined weight of blood within a collection bag containing a premeasured quantity of preservative. In addition, the device includes a mechanism for clamping the tubing through which the blood flows into the collection bag. As a unit, this device is presently widely used and contains all of the equipment necessary to collect the blood within the collection bag and temporarily clamp the tubing attached to the bag until the tube is permanently sealed.

To meet the need for readily and easily sealing blood filled plastic tubing, a hand-held operated tubing sealer has been developed and is described in U.S. Pat. No. 4,013,860 entitled "HAND HELD ELECTRO MECHANICAL SEALER", assigned to the present assignee. This sealer is a readily transportable sealer of small size and it is hand operated to form dielectric heat seals in any plastic tubing placed intermediate its jaws. Thus, it is readily useable to form seals at the donor prior to withdrawing the needs and maintaining a sterile closed system. Also, a plurality of sealed segregated compartments. along a length of tubing filled with blood can be completed, wherein each of the compartments is identified with a common serial number. Thereafter, the compartments may be segregated from one another and various tests may be performed upon the sample of blood contained in the compartments. This capability is particularly important where testing is necessary and yet maintenance of the seal for the blood within the attendant collection bag is not to be disrupted or broken.

At most blood collection centers, such as those operated by the Red Cross, much of the manual labor is performed as charitable work by older persons. These persons often are physically handicapped by the natural processes of aging, by arthritis or by previous injuries. For those persons whose hands are not strong or who suffer pain when they attempt to grip an article with their hands, the above described hand held sealer is difficult or painful to use. Consequently, the rate or production of seals is substantially slower than optimum.

The desk mounted sealer described in U.S. Pat. No. 4,186,292, which is assigned to the present assignee, is useable by an operator who is either seated or standing and it provides a direct line of sight for the operator in either position. Thereby, operator fatigue is diminished and accurate positioning of the liquid filled tubing to be automatically sealed is promoted. Through actuation of a tubing position sensing switch or a foot operated switch, a seal will be effected in the tubing placed intermediate a fixed and moveable jaw, thereby allowing the operator to use one or both hands to repetitively place and reposition the tubing intermediate the jaws. The housing for the sealer sealingly encloses the operative elements to preclude seepage of fluid thereinto from a burst liquid filled length of tubing. The shaft supporting the moveable jaw and extending from within the housing is sealed through a wiping seal. The jaws themselves and the attendant structure are developed from large mass heat conducting material to dissipate the heat generated by the jaws and preclude heat buildup for the benefit of both the operator and the integrity of the formed seals.

The tubing sealing unit described herein is an improvement upon and includes certain unique features not found in the above-described and other previously developed tubing sealers. For manufacturing efficiencies and compactness, the unit is housed within a rectangular structure one side from which extends a fixed jaw. The fixed jaw includes a vertical channel attendant the structure forming the seal to accommodate rapid drainage of fluid in the event the tubing should burst during formation of the seal. The drainage will be exterior of the unit and thereby prevent contamination of the mechanical and electrical components attendant the unit. Switch means actuated by interception and reflection of a light beam attendant the fixed jaw triggers the unit to effect a seal and thereby eliminates operator actuation of the unit.

It is common for an operator to place a blood bag upon the unit when the tubing therefrom is being sealed. Spoilage of the blood will result if the bag placed upon the unit is subjected to heat above normal body temperature. The heat produced by certain of the components within the unit as a result of generation of RF energy to effect the tubing seals is channeled by conduction to the bottom plate or to a finned heat exchanger exterior of the unit. Dissipation of heat from both the bottom plate and the heat exchanger is by convection. Because of such heat channeling, the top of the unit upon which blood bags are often placed, is maintained at essentially ambient temperature and spoilage of the blood will not occur.

It is therefore a primary object of the present invention to provide heat channeling within a tubing sealing unit to prevent internal heat build up.

Another object of the present invention is to provide a tubing sealing unit having compactly located components which channel heat to heat dissipating radiators to prevent heat build up.

Still another object of the present invention is to provide a high powered tubing sealing unit made possible through controlled heat channeling.

Yet another object of the present invention is to permit the use of non-thermally insulated jaws for heat sealing tubing by eliminating heat build up.

A further object of the present invention is to provide means for automatically actuating a tubing sealing unit upon placement of tubing intermediate sealing jaws.

A yet further object of the present invention is to provide a sealing head constructed to preclude irradiating an operator and the environment with RF energy.

A still further object of the present invention is to provide a sealer having a self-cleaning tubing sealing head extending external of a housing for the operative components.

These and other objects of the present invention will become apparent to those skilled in the art as the description thereof proceeds.

The present invention may be described with greater specificity and clarity with reference to the following drawings, in which:

FIG. 4 is an elevational view of the jaw assembly;

FIG. 5 is a cross-sectional view taken along lines 5—5, as shown in FIG. 4;

FIG. 6 is a top view taken along lines 6—6, as shown in FIG. 4;

FIG. 7 is a partial view of a fiber-optic bundle employed in conjunction with operation of the sealing jaws;

FIG. 8 is a cross-sectional view taken along lines 8—8, as shown in FIG. 7;

FIG. 9 is a cross-sectional view taken along lines 9—9, as shown in FIG. 7;

FIGS. 10a, 10b and 10c illustrate structural variations for producing a reflectively interruptable actuation triggering light beam.

Figure 1:
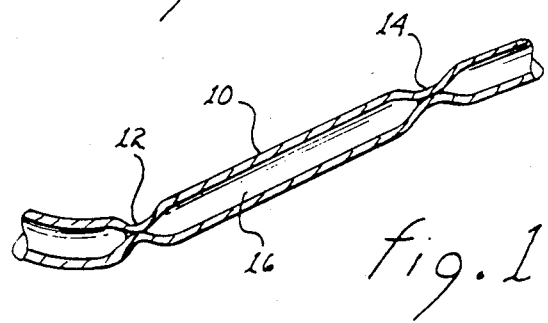
FIG. 1 illustrates a length of liquid filled tubing having a pair of seals defining a compartment therein.

Referring to FIG. 1, there is shown a length of tubing 10, which is similar to the plastic tubing employed in conjunction with blood collection bags. This tubing is of a composition which permits the formation of a seal or weld, such as welds 12 and 14 in the presence of heat after the tubing has been squeezed. By the formation of a plurality of transverse welds across a length of a liquid filled tubing, a plurality of segregable compartments 16 are obtained. Each of these compartments may subsequently be used to test or otherwise analyze the liquid therein or to store the samples of the liquid. When the contained liquid is blood, each of compartments 16 is generally identified by a code or other designation to mate the blood filled collection bag with the blood samples contained in each of the compartments.

Figure 2:
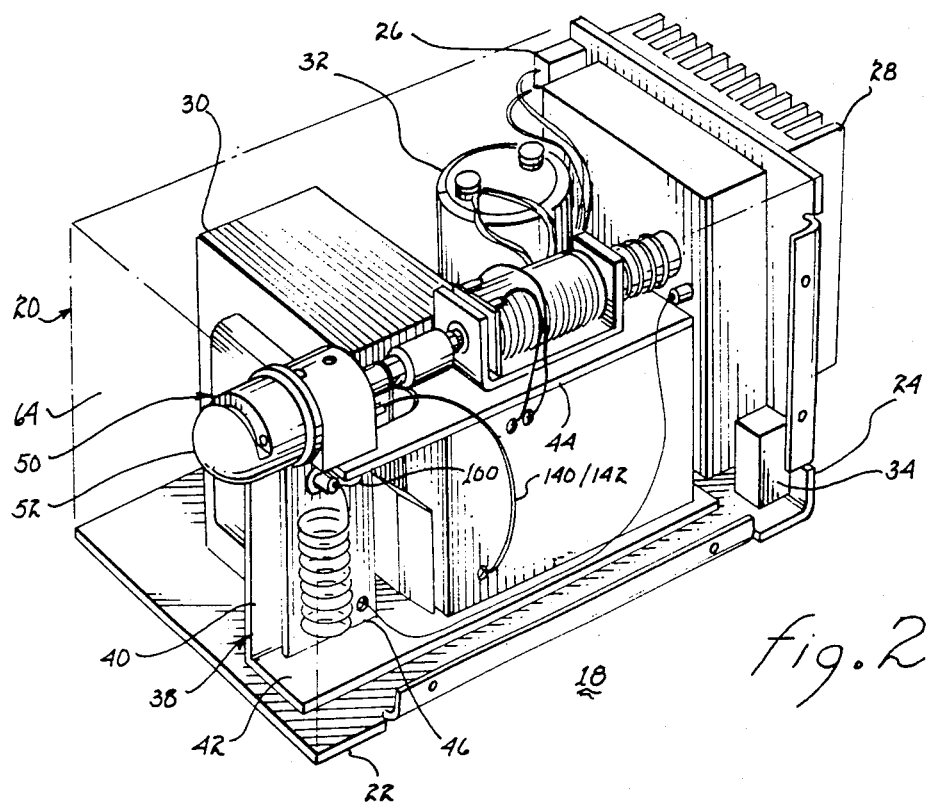
FIG. 2 is a perspective view of the major components of the heat sealing unit.

FIG. 2 is a perspective view of a tubing sealing unit 18. The unit includes a housing 20 detachably attachable to a bottom 22 and rear side 24; preferably, the latter is formed of a single piece of sheet aluminum. Except for a power cord connectable to a source of electrical current, unit 18 includes all mechanical and electrical components necessary to form the seals or welds in the tubing. Oscillator circuit 26 is attached to rear side 24 via a finned radiator 28 extending rearwardly and switch 34 is mounted on the rear side. Electrical components attendant the power supply for the generation of RF energy include a transformer 30 and a physically large capacitor 32, both being secured to bottom 22. A C-channel 38 having web 40 and flanges 42, 44 is attached to bottom 22. Control circuitry is mounted upon a circuit board 46 and the latter is secured to web 40. Flange 44 supports the fixed jaw and the moveable jaw along with the mechanically and electrically operative elements for the latter, collectively referred to as the jaw assembly and identified by numeral 48.

Figure 3:
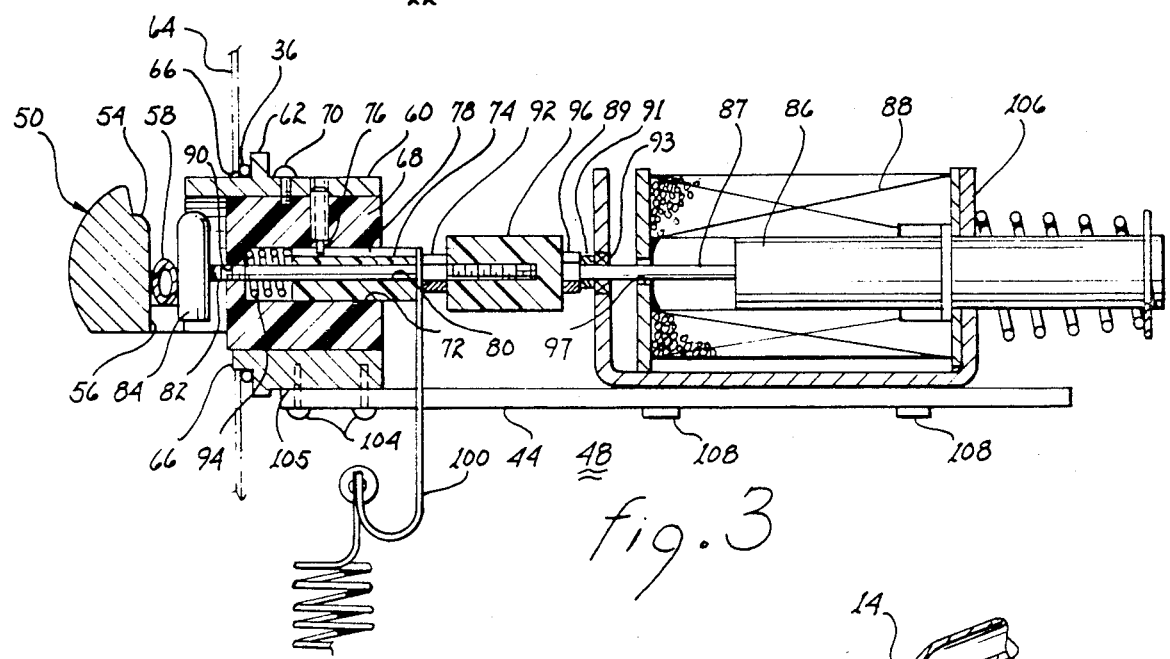
FIG. 3 is a cross-sectional view of the jaws and mechanically operative elements associated therewith.

Jaw assembly 48 will be described with particular reference to FIGS. 2 and 3. Sealing head 50 includes a bulbous end 52 which may be spheriodal in configuration and has formed therein fixed jaw 54. A channel 56 extends through the sealing head proximate and in general alignment with jaw 54 to provide an evacuation path for any liquid flowing from burst tubing 58 located in the vicinity of the fixed and moveable jaws. The bulbous end is formed as part of and supported from a cylindrical shroud 60 having an annular flange 62, which flange bears against via O-ring 36 and is positionally maintained adjacent side 64 of housing 20. It is understood that side 64 includes an aperture 66 somewhat larger than the circumference of shroud 60 to prevent binding therebeteween and afford removal of housing 20. A cylindrically shaped insulator 68 is located interior of shroud 60 and secured therein by nylon machine screw 70 or the like.

A cylindrical cavity 72 is formed within insulator 68 to accommodate a bushing 74. Rotation of the bushing about its longitudinal axis within the cavity is prevented by a set screw 76 slidably engaging a channel 78 or the like extending along the bushing. One end of rod 82 is threaded to threadedly engage and support moveable jaw 84. The rod is penetrably slidably inserted through aperture 90 interconnecting the end face of insulator 68 with cavity 72. A further section of rod 82 is threaded for threaded engagement with threaded passageway 80 extending through bushing 74. Rotation of rod 82 about its longitudinal axis within the bushing is precluded by lock nut 92 threadedly engaging the rod and when drawn tight bears against the end face of the bushing. By this means, rotation of the rod with respect to the bushing is precluded and rotation of the bushing is precluded by set screw 76, the combination of which maintains moveable jaw 84 aligned with fixed jaw 54. A spring 94 is disposed within cavity 72 intermediate the end wall and bushing 74 to actuate automatic retraction of the moveable jaw. The other end of rod 82 is threaded for threaded engagement with a bumper 96. The function of the bumper is that of ameliorating the impact force of plunger 86 of solenoid 88 and yet assure rectilinear translation of the jaw in response to actuation of the plunger. Lock 92 threadedly engages rod 82 to secure flexible electrical conductor 100 from the control circuit board 46 to the rod and make good electrical and mechanical contact therewith.

Plunger 86 includes a rod 87 extending therefrom and having a threaded end. A nut 89 is secured to the threaded end of rod 87 to provide an enlarged surface area bearing against bumper 96. A sleeve like damper 91 is disposed about rod 87 adjacent nut 89 to dampen the impact and vibration created by the plunger on retraction of same. A bearing 93 may be incorporated within bracket 106 to provide a bearing surface during translation of the rod. A suitably dimensioned aperture 97 is disposed in the side of frame 95 to permit penetration therethrough of rod 87. It will be appreciated that the lack of rigid mechanical interconnection between the plunger and the moveable jaw and its supporting rod obviates close alignment requirements during assembly and completely avoids problems of binding which would otherwise occur during use.

Sealing head 50 is affixed to flange 44 by machine screws 104 or the like engaging a portion of shroud 60. It may be pointed out that bottom surface 105 of the shroud adjacent the flange is planar and rectangular in cross-section commensurate with the width and depth of the shroud to maximize the surface area adjacent the flange. Thereby, heat transfer by conduction from the shroud, and ultimately from bulbous end 50, to flange 44 will be maximized.

Solenoid 88 is secured to a bracket 106, which bracket has a substantial surface area in contact with flange 44 to promote heat transfer by conduction from the solenoid and bracket to the flange. The bracket is secured to the flange by attachment means 108.

Referring jointly to FIGS. 4, 5 and 6, sealing head 50 will be described in further detail. The portion of the sealing head protruding from side 64 of housing 20 is generally cylindrical in configuration and terminted by a spheroid shaped bulbous end 52. The lower portion is truncated and defines an essentially horizontal surface 110. The upper part of shroud 60 is circular in cross-section as particularly shown in FIG. 6 and the lower part is defined by vertically depending sides 112 and 114 terminating as the lateral extremities of rectangular bottom 105. Preferably, the sealing head is cast of aluminum or similar reasonably lightweight material having very good thermal conduction properties; it may be termed a first heat sink means.

A slot 116 is formed in the sealing head to receive tubing 58 to be welded intermediate fixed jaw 54 and moveable jaw 84. The dimensions of slot 116 are maintained such as to preclude an operator's fingers from being inserted therein. Thereby, inadvertent actuation of the moveable jaw and inadvertent irradiation of an operator's fingers is precluded.

The presence of slot 116 along with vertical channel 56 (see FIG. 3) provides for convection of ambient air through the sealing head to aid in drawing off the heat generated by the transmission of RF energy between the jaws. Any heat build up from the jaws within the sealing head is transmitted by conduction to shroud 60 and therefrom to flange 44 via bottom 105. Because of the marginal contact intermediate the edge of aperture 66 in side 64 of the housing, little, if any, heat transfer therebetween occurs.

Referring jointly to FIGS. 6 through 10c, the means for automatically actuating the mechanical and electrical components to effect a weld will be described. A circular passageway 120 is formed between the rear surface of shroud 60 and the rear surface of slot 116 to receive a fiber-optic bundle 122. The fiber-optic bundle includes a first bundle 124 for transmitting a beam of light and a second bundle 126 encircling the first bundle for receiving light reflected from the light beam transmitted by the first bundle. The physical integrity of fiber-optic bundle 122 is protected by sleeve 128 or the like, which sleeve is mounted within passageway 120. The center of passageway 120 with respect to bottom 117 of slot 116 is commensurate with the horizontal axis of tubing 58 placed within the slot and prior to squeezing of same. The passageway is disposed lateral of channel 56 extending vertically through the sealing head. With such location of the passageway and the fiber-optic bundles disposed therein, there is a reduced likelihood that the end of the fiber-optic bundles will be contaminated by spilled liquid; moreover, this location provides the greatest probability that any light emitted from bundle 124 will be reflected by the tubing placed in the slot will impinge upon bundle 126, To prevent light cross talk between the bundles, bundle 124 is coated with a non-light transmissive medium 127, such as a coat of black paint. The light received by bundle 126 is the reflected light from bundle 124. Because the angles of incidence and reflection are small and the reflecting surface, the tubing, is close to the light source, the position of bundle 126 must be very close about bundle 124. Therefore, a more conventional sleeve or other light shield about bundle 124 cannot be used because it would misplace laterally bundle 126 sufficiently to preclude irradiation by the reflected light.

When the tubing sealing unit is turned on, light is emitted from first bundle 124. To prevent light impingement upon second bundle 126 due to extraneous reflection in the absence of tubing 58 disposed within slot 116, several means may be employed. FIG. 10a illustrates the use of a reflecting surface on sloping side 132 of slot 116. By maintaining an appropriate slope angle, the reflected beam will be directed lateral of and not impinge upon second bundle 126. FIG. 10b illustrates the use of a passageway 136 within bulbous end 52 to permit transmission therethrough of any light emanating from first bundle 124. However, there may exist a problem of ambient light passing through passageway 136 to impinge upon second bundle 126. A third means for avoiding inadvertent light impingement upon second bundle 126 is shown in FIG. 10c. Herein, a portion of sloping side 132 of slot 116 is blackened by suitable anodizing or other means to constitute a non-light reflective surface. In example, it has been learned that if the sealing head is of aluminum, the surface can be oxidized, which oxidization produces a flat black surface.

One of the advantages of using fiber-optics as the triggering apparatus resides in its immunity to RF energy. Therefore, spurious signals from the RF circuitry will not be imposed on the triggering circuitry. Furthermore, by avoiding a switch dependent upon depression by the tubing, no tension forces will be imposed upon the tubing during the weld formation. Such tensile forces, even though slight, will encourage bursting of the tubing when the tubing is heated and fluid.

Referring to FIG. 7, there is shown fiber-optic cables 140, 142 interconnected with fiber-optic bundles 124, 126, respectively. Cable 140 is interconnected with a source of light (not shown) and cable 142 is interconnected with a photodiode or the like (not shown) for sensing any light transmitted therethrough.

In operation, an operator, after energizing the tubing sealing unit, places a section of tubing within slot 116. On placement therein, the light emitted by first bundle 124 will be reflected and impinge upon second bundle 126 and a responsive signal will be generated by the control circuit. The solenoid will be energized to translate moveable jaw 84 and begin to squeeze the tubing. The change in capacitance between the fixed and moveable jaws is sensed by the circuitry and the power level of the RF energy transmitted across the jaws is increased momentarily to melt and fuse the tubing to make the weld or seal. Thereafter, the solenoid retracts, the moveable jaw returns to its rest position and the transmission of RF energy ceases. The tubing may then be withdrawn.

In use, an operator has a tendency to place a blood collection bag upon housing 20 because it is convenient. If the blood is heated to a temperature much above normal human body temperature, the blood will tend to decompose and become useless. It is therefore mandatory to insure that upon placement of a blood bag upon the housing, the temperature of the housing be at or below body temperature and preferably at room temperature. Such temperature control and regulation can be effected by self-contained or external cooling units; either solution adds complexity, size, weight and cost.

Figure 11:
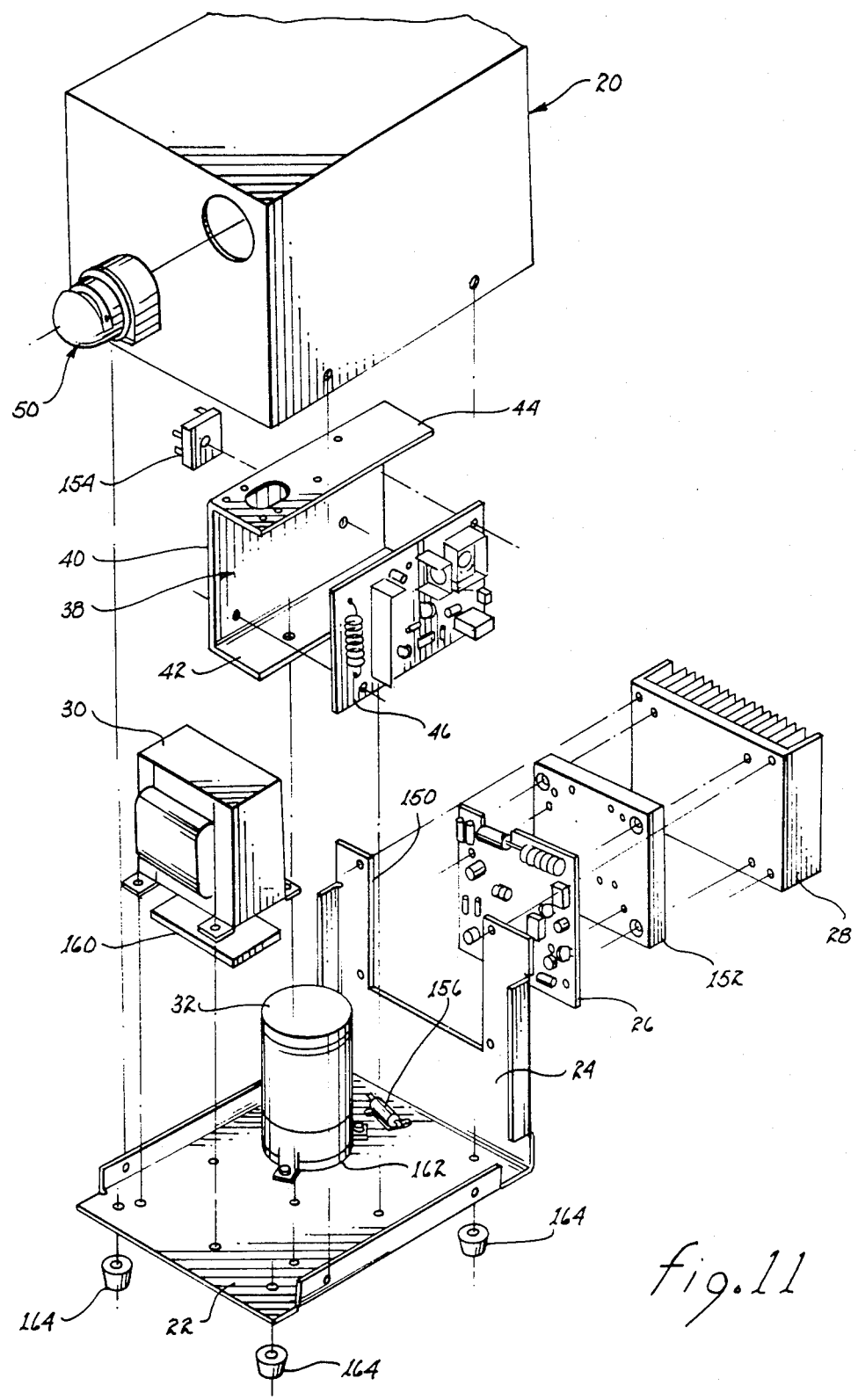
FIG. 11 is an exploded view to illustrate the heat channeling components.

Referring to FIG. 11 there is illustrated a constriction of tubing sealing unit 18 which provides passive heat transfer sufficiently effective to keep the top of housing 20 at or near ambient temperature. The greatest source of heat is circuit board 26 containing an high power oscillator circuit which generates substantial heat. It is therefore mandatory to direct or channel the heat generated therefrom external of housing 20. Such channeling is effected in the following manner. A cut out section 150 is formed in side 24 which section is dimensioned to be greater than circuit board 26 to preclude direct physical contact therebetween. The circuit board is mounted upon a heat sink plate 152, which heat sink is dimensioned commensurate with that of circuit board 26 to draw off heat therefrom by both conduction and convection. The heat sink is attached to finned radiator 28, which radiator dissipates heat by convection to the ambient air and may be termed a second heat sink means. The lateral extremities of the radiator are attached to side 24.

Several of the components mounted upon circuit board 26 generate a substantial amount of heat and are usually used in conjunction with individual heat sinks. These elements are directly mounted upon heat sink plate 152 to maximize conduction of heat thereto and away from the interior of the housing. Heat sink plate 152 is not mounted in contacting relationship adjacent the rear surface of circuit board 26 as such mounting would short the nongrounded leads and lands upon the circuit board. Rather, the circuit board is mounted upon short stand-offs of a length sufficient to clear the leads extending from the rear surface of the board. Thereby, the heat generated by any components not directly heat sunk to the heat sink plate is conveyed by convection to the head sink plate.

With the above described method of attachment, any heat generated by circuit board 26 to be conveyed to side 24 must pass through heat sink 152 into radiator 28 and laterally therefrom to the edges of cut out 150. Since heat will be constantly radiated from the fins of radiator 28, the temperature gradiant between the point of attachment of the radiator and the point of attachment on side 24 is relatively low; and, little heat transfer by conduction will occur. Therefore, the heat generated is effectively channeled exterior of the unit.

The power supply primarily includes transformer 30, capacitor 32, rectifier 154 and bleed off resistor 156. Transformer 30, like all transformers, generate a quantum of heat. Normally, such heat is dissipated by convection. To prevent heating of the air within housing 20 by transformer 30, a thermally conductive plate 160 is dimensioned to fit between the mounting feet of the transformer and of a thickness sufficient to make good thermal contact between the edge of the laminations of the transformer and the upper surface of bottom 22. Thermal conduction is aided by applying a thermally conducting compound between the transformer and the plate ahd between the plate and bottom 22. With such arrangement, the heat generated by transformer 30 will be channeled by conduction through plate 160 to bottom 22 and very little of the heat generated will be transfered by convection to the air within housing 20. Capacitor 32 generates a quantum of heat. Such heat is usually permitted to be dissipated by convection. To minimize heating of the interior of housing 20 by capacitor 32, its mounting lugs are bent to insure good thermal contact between lower surface 162 of the capacitor and bottom 22. Thereby, a substantial portion of the heat generated by the capacitor is transmitted by conduction directly to bottom 22. Bleed off resistor 156 is electrically associated with capacitor 52 and is usually mounted on top thereof. This resistor generates a substantial amount of heat. The heat it generates is dissipated through bottom 22 by mounting the resistor upon the bottom surface and enhancing thermal conduction thereto by placing thermally conductive compound therebetween. Rectifier 154 generates some heat. This heat is withdrawn and channeled to bottom 22 by mounting the rectifier upon web 40 of channel 38. The heat transferred from the rectifier to the web is transmitted through flange 42 directly to bottom 22, which bottom may be termed a third heat sink means.

As alluded to above, channel 38 serves as a heat channeling member to transmit heat by conduction from sealing head 50 and circuit board 46 directly to bottom 22 and may be termed a fourth heat sink means. The heat dispersed from the sealing head is sufficient to maintain it cool enough to touch by an operator so that the expense of a thermal shield is avoided. It may also be noted that flange 44, extending laterally above the circuit board will tend to be heated by any air rising due to convection from the heating by various components mounted upon the circuit board. The heat acquired by the flange will be channeled by conduction through web 40 into flange 42 for dissipation through bottom 22.

Bottom 22 is raised above a supporting surface through use of feet 164. The resulting air space between the supporting surface and bottom 22 permits a flow of air therethrough to dissipate heat from bottom 22 by convection.

Through tests conducted on prototypes of the invention, it has been determined that the top surface of housing 20 may be as much as 20° F. cooler than bottom 22. Such tests clearly indicate that the channeling of the heat generated by the manner described above works and is effective to maintain the top of the housing at or below body temperature. Thereby, an operator may place a blood collection bag upon housing 20 without fear of decomposition or violation of the integrity of the collected blood.

It is preferable to minimize the time for making a seal in tubing and to produce a tubing sealer which will comport with the demand for seals placed upon it by an operator. One way in which the operation of a tube sealer may be made more rapid is by applying a greater quantity of power for a shorter time period. The power which is available for delivery by the jaws is a function of the dissipation rate of the heat generated to avoid a temperature rise of the housing beyond an established level. The heat channeling described above has been found to be very efficient. Accordingly, components having higher power generating capabilities to increase the level of RF energy transmitted between the jaws can be used than known prior art tubing sealers while still retaining the previously described temperature constraints on the housing. Therefore, not only does the arrangement of components described above effectively dissipate the heat generated but the arrangement permits the use of higher power level components to generate a higher level of RF energy without creating an unacceptable temperature level for the unit.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

We claim:

1. Apparatus including a fixed jaw cooperating with a moveable jaw for squeezing tubing placed therebetween and welding the squeezed tubing by irradiating the tubing with RF energy, said apparatus comprising in combination:
    (a) a sealing head having a spheroid surface to provide uniform heat radiation in different directions, said sealing head including said fixed jaw;
    (b) a channel extending through said sealing head defined in part by said fixed jaw and in general alignment with said fixed jaw for accommodating flow through said sealing head of any fluid which may emanate from the tubing on bursting of the tubing during welding of the tubing;
    (c) a cavity disposed within said sealing head;
    (d) a bushing slidably disposed within said cavity for supporting said moveable jaw;
    (e) means for attaching said moveable jaw to said bushing;
    (f) means for moving said bushing to squeeze the tubing against said fixed jaw by said moveable jaw; and
    (g) means for transmitting RF energy between said moveable and fixed jaws to heat and weld the tubing placed therebetween.

2. The apparatus as set forth in claim 1 including an electrical insulator disposed within said sealing head and wherein said cavity is disposed within said insulator.

3. The apparatus as set forth in claim 2 including a longitudinally oriented channel in said bushing and a set screw extending from said insulator into said channel to prevent rotation of said bushing relative to said sealing head.

4. The apparatus as set forth in claim 1 wherein said moving means comprises a solenoid.

5. The apparatus as set forth in claim 4 including interconnecting means disposed between said bushing and said solenoid for urging said bushing only in one direction on energization of said solenoid and spring means for urging said bushing in the other direction on deenergization of said solenoid.

6. The apparatus as set forth in claim 1 including a slot disposed in said sealing head for receiving the tubing to be sealed.

7. The apparatus as set forth in claim 6 wherein said fixed jaw is located on one side of said slot and said moveable jaw is extendable from the opposed side of said slot.

8. The apparatus as set forth in claim 7 wherein said slot is juxtaposed with said channel.

* * * * *